United States Patent Office 3,081,887
Patented Mar. 19, 1963

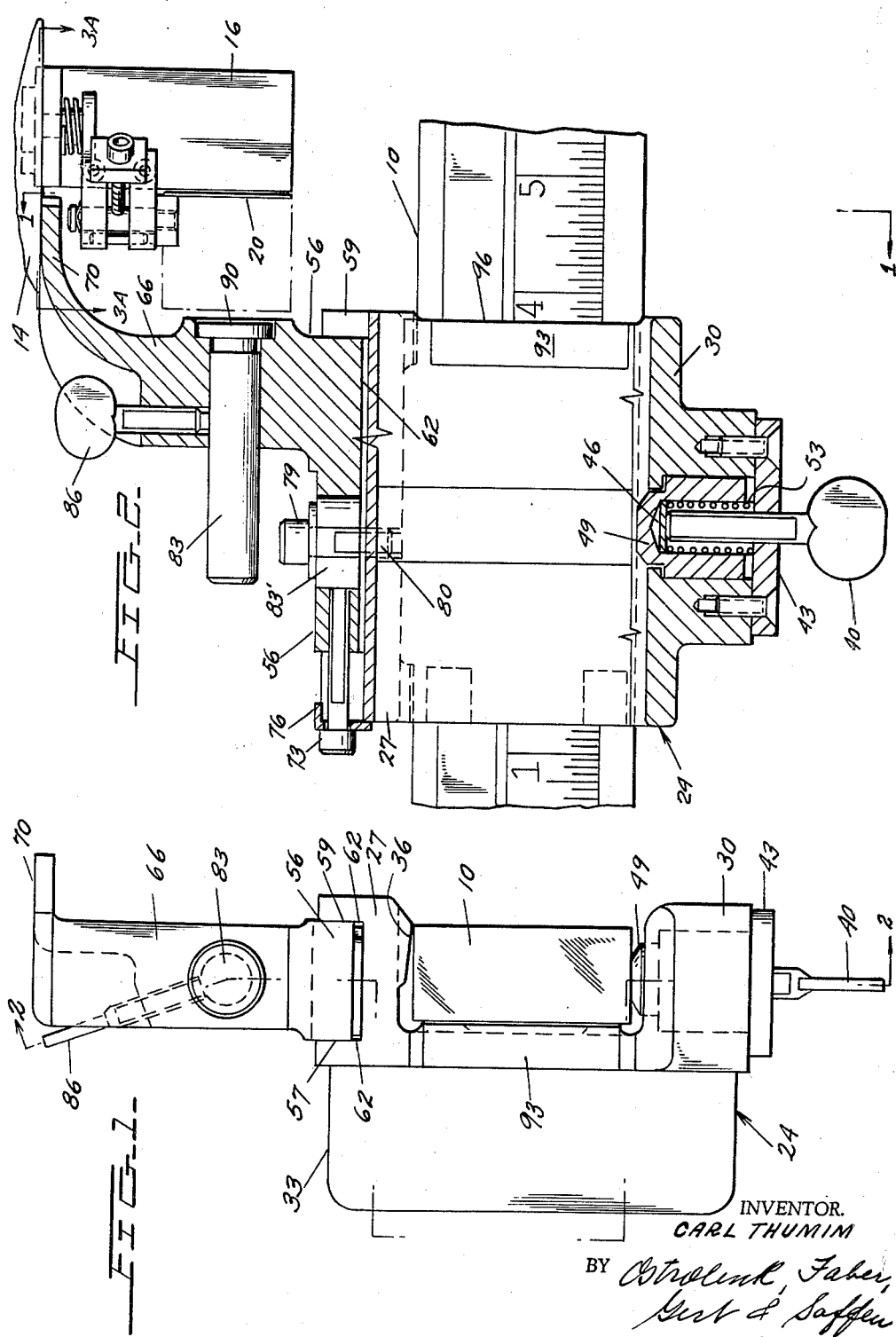

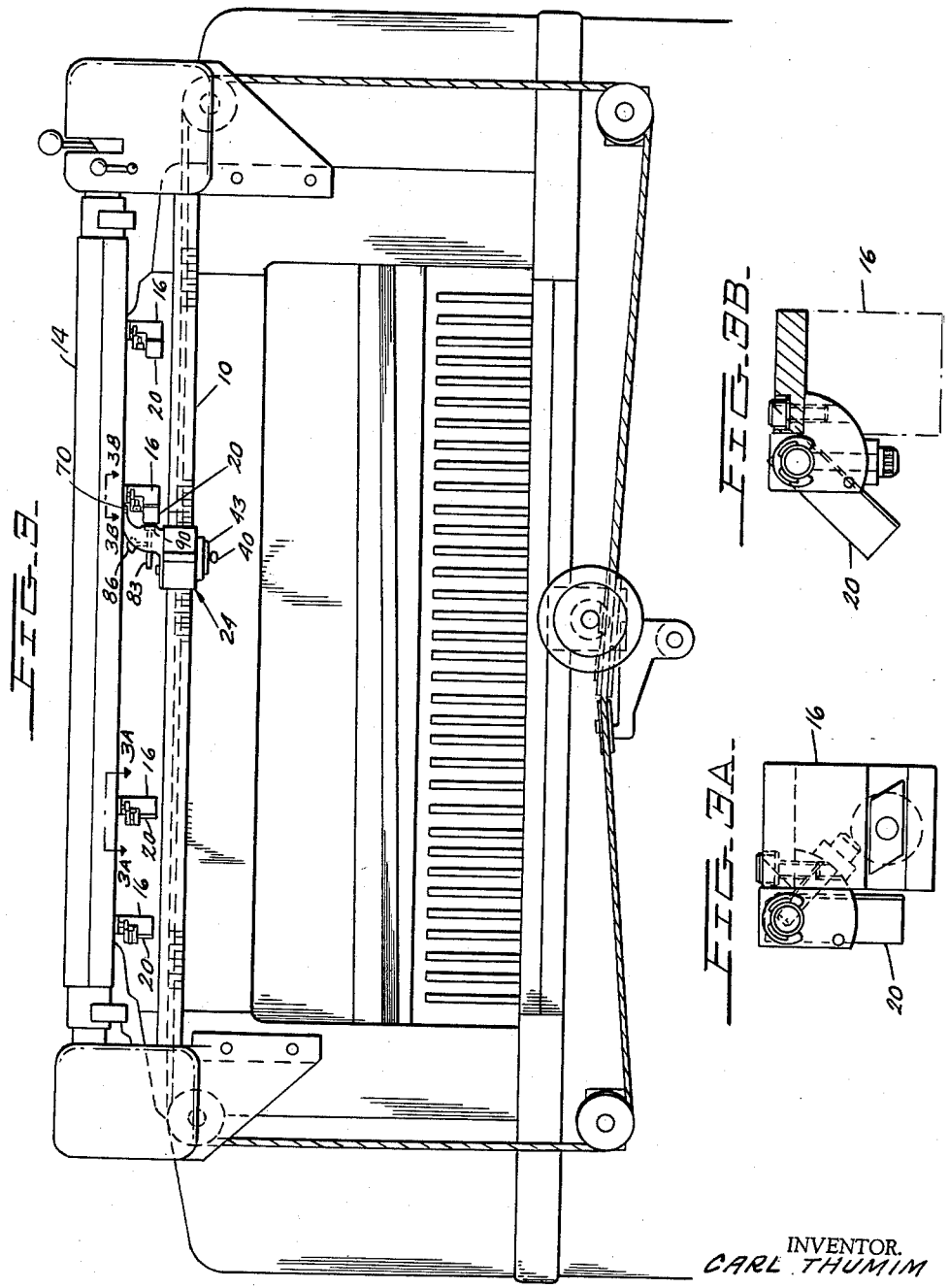

3,081,887
SPACING TOOL FOR PREDETERMINING BACK GAUGE MOVEMENTS OF PAPER CUTTING MACHINES
Carl Thumin, Westbury, N.Y., assignor, by mesne assignments, to Miehle-Goss-Dexter, Inc., a corporation of Delaware
Filed Mar. 24, 1959, Ser. No. 801,520
6 Claims. (Cl. 214—1.6)

This device relates to paper cutting machines and more particularly to cutting machines which use photoelectric control means for setting the back gauge for different lengths of cut of a pile of paper.

In prior Patent No. 2,737,158, to Seybold assigned to the present assignee, there is shown a guillotine type of paper cutter having a transversely disposed bar which carries a series of opaque signal elements which are spacedly disposed to correspond to lengths of cuts or degrees of back gauge movement, and which opaque signal elements interrupt a light beam traveling relative thereto together with a photoelectric cell. The interruption of the light beam by the opaque signal element serves to start and stop the back gauge for the purpose of pushing the paper stack certain predetermined distances corresponding to lengths of cuts desired. The arrangement also provides additional opaque signal elements for trimout cuts requiring short back gauge traverse.

The present invention is for a manually operable device, or accessory, to be used in conjunction with the opaque signal elements briefly described hereinabove, so that such signals may be conveniently set in desired positions on their supporting bar, with accurate spacing between signals in order to predeterminedly control start, stop, and travel of the back gauge for a plurality of cuts.

Thus, the invention herein disclosed comprises a clamp element which may be secured in a temporary and slidable manner to a transversely disposed scale bar at the front of the machine, adjacent the bar which carries the signals and which clamp element carries indicia means whereby, in co-action with the scale, the clamp may be set in any position relative to the width of the machine, such positions corresponding to lengths of cut or travel of the back gauge. The clamp carries certain gauging elements of an adjustable nature which are disposed in the path of traverse of the signals. Thus, when the clamp has been set in accordance with a desired position as determined by a scale setting, the signals may be moved to abut the gauge elements and thus left set in the exact position desired. The gauging elements are particularly designed so as to set the position for a signal together with its associated trim-out signal. Accordingly, by shifting the clamp along the scale from position to position, a series of signals and associated trim-out signals may be positioned accurately and quickly so that subsequent traverse of the light beam and photoelectric cell relative to the positions of the light blocking opaque signal elements control movement of the back gauge and thus of the paper pile.

A detailed description of the invention will now be given in conjunction with the appended drawing in which:

FIGURE 1 is an elevation looking in the direction of motion of the clamp element as associated with a scale bar.

FIGURE 2 is an elevation in cross-section taken through 2—2 of FIGURE 1.

FIGURE 3 is a front view of a guillotine type of paper cutting machine showing the arrangement of a scale bar extending transversely across the front of the machine and carrying a spacing tool for setting predetermined positions of signal elements.

FIGURES 3A and 3B are top views taken from line 3a of FIGURE 3 and showing different positions and arrangements of signal elements 16 and flag elements 20.

Referring to the drawing, a scale bar 10 is shown and it will be understood that the scale bar is rigidly fastened, transversely of the machine, disposed below the hexagonally shaped bar 14, which carries opaque signal elements such as 16 and opaque trim-out signal flag elements such as 20. With reference to FIGURE 1, a clamp element 24 will be seen to be carried on the scale bar 10. Clamp element 24 moves in and out of the plane of the paper as seen on FIGURE 1 and to the left or right as viewed on FIGURE 2 being moved by manual sliding on the scale bar 10.

In order to secure the clamp element to the scale bar, the clamp element is provided with an upper jaw 27 and a lower jaw 30 both integral with the back 33 which forms the main portion of that element. The upper jaw 27 is provided with a sloping surface 36 which rides on the outer, upper edge of the scale bar as clearly seen on FIGURE 1. The lower jaw 30 is provided with a thumb screw 40 carried in a plate 43 bolted to the lower jaw 30 as shown. An abutment disk 46 engages the top of the thumb screw 40 and carries a rider cap 49 slidably engaging the bottom edge of the scale bar 10. Thus, if the thumb screw 40 be tightened, pressure is exerted through elements 46 and 49 against the bottom edge of the scale bar to rigidly clamp the spacing tool thereto, if desired. Normally, the clamp is held on the spacing bar by means of a compression spring 53 intermediate plate 43 and abutment disk 46 acting against the cap 49.

From the above description it will be apparent that the spacing tool may be slid left or right on the scale bar and fastened in any desired position thereon.

The jaw 27 carries thereon a slidable plate 56 between guides 57 and 59 suitably machined in the jaw as clearly seen on the drawing. The plate 56 is carried on shims 62 so as to provide accurate vertical positioning thereof. Plate 56 has a vertical projection or standard 66 thereon which terminates in an offset (FIGURE 1) horizontal gauging finger 70. Further, plate 56 may be shifted left or right as seen on FIGURE 2 by means of an adjusting screw 73 abutting an angle plate 76 and threadedly engaging plate 56 as shown. A cap screw 79 passing through a slot 83' in plate 56 is utilized to secure plate 56 in any adjusted position, it being understood that cap screw 79 has threaded connection with jaw 27 at 80.

From the foregoing it will be apparent that plate 56, and thus finger 70, may be slidably adjusted with respect to the clamp and fixed in any adjusted position with respect thereto.

The vertical standard 66 carries a relatively slidable pin 83 which can be manually moved to any desired position relative to the standard and fixed in that position by a thumb screw 86 threadedly carried in the standard. An exterior face 90 is provided on pin 83 for gauging purposes to be hereinafter described.

One end of the clamp 24 carries an indicia member 93 having an indicator edge 96 arranged perpendicular to the scale bar and it will be apparent that the clamp may be set at any indicia of the scale bar by lining up edge 96 therewith.

From the above description the operation and utility of the spacing tool will be apparent. Thus, when it is desired to set an opaque signal element 16 at a particular position, it is only necessary to set the clamp with respect to the scale at a position corresponding to the desired position of the element 16. The clamp may then be tightened on the scale bar by means of the thumb screw 40 if desired, or merely permitted to remain in that position, relying on compression of the spring 53. Signal 16 may then be slid toward finger 70 until it engages the finger and such positioning of the signal then corresponds to the desired position, it being understood that the finger 70 is originally adjusted so as to correspond to the proper distance from the knife edge, as required, by means of any particular installation by means of the adjusting screw 73. After the signal 16 has been thus set, the trim out flag element 20 may then be adjusted against the surface 90 in accordance with the prior predetermined position of that surface. Accordingly, the cut and trim-out at one station is thus readily determined. The clamp may then be slid along the scale bar toward the right and each cut and trim-out signal component set in the same manner in accordance with the indicia of the scale bar.

It will be further apparent from the above description that the spacing tool may be readily snapped on to the scale bar or removed therefrom by virtue of the co-action between the slanting 36 and the spring 53.

It should be noted that the scale bar need not be graduated in length units, but could carry a strip of tape adhering thereto on which markings have been placed by an operator, which markings correspond to a series of predetermined cuts. Such tape may in fact be placed elsewhere on the machine, other than on the scale bar, to co-act with a suitably provided edge or guide-line carried by the spacing tool.

While my spacing tool is primarily intended for use in conjunction with a photoelectrically controlled machine as generally described above, persons skilled in the art will recognize that such a tool would also have utility for setting any motion limiting elements having the same general arrangement as the light blocking elements. Accordingly, I do not seek to be limited to the precise illustration of the specific spacing tool nor the specific type of cutting machine hereinabove described except as set forth in the appended claims.

I claim:

1. In a paper cutting machine having a photoelectrically controlled back gauge; photoelectric signal means and means for setting said signal means comprising a scale bar extending transversely of said machine and visible to an operator, a slide element carried on said scale bar and having indicia means registerable with indicia on said scale bar, resilient means carried by said slide element for holding said slide element in predetermined adjusted positions of said scale bar, gauge means carried by said slide element, means for adjusting said gauge means with respect to said slide element in the direction of movement of said slide element on said scale bar, said gauge means comprising a gauge finger extending in said direction of movement, said gauge means further comprising a gauge pin slidably carried thereby and means for adjusting said pin with respect to said gauge means in predetermined positions with respect to the direction of said movement.

2. In a paper cutting machine having a photoelectrically controlled back gauge; a plurality of movably positionable photoelectric signal elements, at least one of said plurality of signal elements having a trim-out signal flag element operatively connected thereto, a support means extending transversely of said machine, and indicia means extending transversely of said machine substantially co-extensive with said support means, a spacing tool movably carried on said support means and having indicator means registerable with said indicia means in various positions of said spacing tool whereby said spacing tool is positionable on said support means at predetermined points, gauge means carried by said spacing tool disposed for engagement with said signal elements, and gauge means carried by said spacing tool disposed for engagement with said trim-out signal flag element whereby said signal elements and said trim-out signal flag elements may be moved to predetermined positions in accordance with said indicia means.

3. In a paper cutting machine having a photoelectrically controlled back gauge; a plurality of movably positionable photoelectric signal elements, at least one of said plurality of signal elements having a trim-out signal flag element operatively connected thereto, a support means extending transversely of said machine, and indicia means extending transversely of said machine substantially co-extensive with said support means, a spacing tool movably carried on said support means and having indicator means registerable with said indicia means in various positions of said spacing tool whereby said spacing tool is positionable on said support means at predetermined points, gauge means carried by said spacing tool disposed for engagement with said signal elements, and gauge means carried by said spacing tool disposed for engagement with said trim-out signal flag element whereby said signal elements and said trim-out signal flag elements may be moved to predetermined positions in accordance with said indicia means, said support means being a scale bar and said indicia means being carried on said bar; said spacing tool comprising a clamp element slidably disposed on said scale bar.

4. In a paper cutting machine having a photoelectrically controlled back gauge, a plurality of movably positionable photoelectric signal elements, at least one of said plurality of signal elements having a trim-out signal flag element operatively connected thereto, a support means extending transversely of said machine and indicia means extending transversely of said machine substantially co-extensive with said support means, a spacing tool movably carried on said support means and having indicator means registerable with said indicia means in various positions of said spacing tool whereby said spacing tool is positionable on sad support means at any desired point thereon, gauge means carried by said spacing tool and disposed for engagement with said signal elements, and additional gauge means carried by said first-mentioned gauge means and disposed for engagement with said trim-out signal flag element.

5. In a device as set forth in claim 4, wherein said support means is a scale bar and said indicia means is a scale carried on said bar, and wherein said spacing tool comprises a clamp element slidably disposed on said scale bar.

6. In a device as set forth in claim 5, said clamp element having an open side whereby it can readily be disposed on or removed from said scale bar by movement transverse to the direction of movement of said clamp element when supported on said scale bar.

References Cited in the file of this patent

UNITED STATES PATENTS

| | | |
|---|---|---|
| 1,900,231 | Ede | Mar. 7, 1933 |
| 2,175,650 | Schaber | Oct. 10, 1939 |
| 2,458,344 | Carroll | Jan. 4, 1949 |
| 2,622,332 | Paul | Dec. 23, 1952 |
| 2,737,158 | Seybold | Mar. 6, 1956 |
| 2,759,270 | Fine | Aug. 21, 1956 |
| 2,821,252 | Thumin | Jan. 28, 1958 |
| 2,860,705 | Thumin | Nov. 18, 1958 |
| 2,882,606 | Hitchcock | Apr. 21, 1959 |